May 16, 1967

C. N. WALTER 3,319,596

SIGNALING DEVICE

Filed March 27, 1964

CLETUS NEAL WALTER
INVENTOR

Huebner & Worrel
ATTORNEYS

CLETUS NEAL WALTER
INVENTOR

Huebner & Worrel
ATTORNEYS

CLETUS NEAL WALTER
INVENTOR

Huebner & Worrel
ATTORNEYS

United States Patent Office 3,319,596
Patented May 16, 1967

3,319,596
SIGNALING DEVICE
Cletus Neal Walter, San Diego, Calif., assignor of thirty-seven and one-half percent to the firm of McCormick, Barstow, Sheppard, Coyle & Best, Fresno, Calif.
Filed Mar. 27, 1964, Ser. No. 355,175
10 Claims. (Cl. 116—63)

The present invention relates to a signaling device for depositing separable signal members in predetermined areas to warn of hazardous conditions and more particularly to a combined signal and signal discharging device which may be mounted on a vehicle for discharging the signal during movement of the vehicle toward or through a danger area so as to warn oncoming and following traffic.

Conventional warning devices, such as flares, battery-powered flashlights and the like are customarily employed at the scene of traffic accidents to warn approaching motorists of hazardous conditions. The highway patrol, sheriff's patrol officers, ambulance drivers and the like ordinarily do not have time to stop en route to the scene of an accident to place such warning devices on the highway any substantial distance spaced from the scene of the accident for advanced warning of approaching traffic. Other frequent travelers on highways, such as the drivers of cargo-carrying trucks and the like, have no prior warning of an accident but frequently stop to render aid when encountering such hazardous conditions. Their assistance, however, is usually limited to the immediate area of the accident and time and traffic conditions normally do not permit return along the highway to deposit the warning devices any substantial distance ahead of the accident. Furthermore, all of the above described warning devices require manual placement on the highway. As a result, the depositors of such warning devices must leave the vehicles in which they have been traveling with consequent exposure to traffic. As a result, many persons endeavoring to provide adequate warning of accidents have themselves been seriously injured and killed while placing warning flares, battery-powered lights and the like.

Therefore, it is an object of the present invention to provide a signaling device which enables signals to be deposited in areas of danger without exposing the operators of the device to danger.

Another object is to provide such a signaling device which is effective to deposit the signals sufficiently ahead of the danger area to provide ample warning of such danger.

Another object is to provide a signaling device which has particular utility for warning motorists of hazardous conditions on the highway.

Another object is to provide a signaling device of the character described which may be permanently mounted on a vehicle.

Another object is to provide such a signaling device which may be controlled by the operator of the vehicle and which is effective accurately to deposit the signals without stopping the vehicle.

Another object is to provide a signaling device which is weatherproof and automatically opened during initial discharge of the signals therefrom.

Another object is to provide a signaling device which is effective to deposit signals on the highway at predetermined intervals any desired distance ahead of an accident for ample warning to approaching traffic.

Another object is to provide a signaling device which is compact, simply and easily constructed, and which may be safely and conveniently used.

Other objects and advantages of the present invention will subsequently become more clearly apparent upon reference to the following description in the specification.

Referring more particularly to the drawings, a signaling device embodying the principles of the present invention provides a cylindrical housing 10 having opposite predetermined front and rear ends 11 and 12, respectively, which circumscribe a compartment 14. The housing includes a pair of longitudinally spaced annular flanges 16 circumscribing the outer periphery thereof having foot portions 17 outwardly extended therefrom in diametrically opposed relation at the longitudinal center of the housing. The housing is supported in cradling relation upon a pair of longitudinally spaced upstanding saddle brackets 18 having upper mounting blocks 19 supporting the foot portions 17 of the flanges which are inter-connected by screw threaded bolts 20.

The saddle brackets provide lower support flanges 22 which are secured by a plurality of bolts 23 to a suitable automobile frame structure or the like 26.

Front and rear circular end plates 30 and 32 having circular centrally disposed apertures 33 and 34, respectively therethrough, are mounted on the front and rear ends 11 and 12 of the housing. A tubular barrel mounting sleeve 35 is mounted in the front plate 30 in eccentric relation to the axis of the housing and provides an inner end 36 extended a short distance into the compartment 11 and an opposite outer end 37. An outer barrel constraining flange 38 is mounted on the outer end 37 of the sleeve and is radically spaced from the sleeve to provide a circular slot 39 therebetween. An elongated tubular barrel 45 provides an outer end 46 and an inner end 47 which is slidably received within the annular slots 39 in telescopic relation with the outer end 37 of the sleeve 35 for supporting the same in spaced substantially parallel relation to the axis of the housing. A saddle bracket 48 of a height substantially less than that of the brackets 18 provides a lower flange portion 49 connected by a plurality of bolts 50 to the support frame 26 and an upper arcuate portion 52 disposed in cradling relation to the barrel adjacent to its outer end.

An elongated tubular divided spindle 55 provides opposite front and rear end portions 56 and 57 which are extended through the apertures 33 and 34 of the front and rear plates 30 and 32 of the housing in concentric relation to the axis thereof. The forward end portion 56 of the spindle includes a large diameter axial bore 58 and an interconnecting small diameter axial bore 59 which form a shoulder 60 intermediate the ends of the spindle. The forward end portion also includes a reduced diameter outer screw threaded end 62 extended through the aperture 33 in the front plate which mounts a lock nut 64 tightened against the outer surface of the front plate. Also, an elongated slot 65 is formed in the forward end portion of the spindle in communication with the small diameter bore 59. The inner end of the forward end portion of the spindle mounts an elongated cylindrical casing 66 which encloses an electrical solenoid coil 68. The casing has an inner guide post 69 providing an elongated axial bore 70 having an enlarged diameter threaded end portion 71. The guide post is pressed into the large diameter axial bore 58 of the forward end portion of the spindle. A pair of electrical leads 72 and 73 are outwardly extended from the winding through the casing for connection to a pair of mounting posts 74 and 75 extended through the front plate 30. An elongated solenoid core 76 is axially slidably mounted in the large diameter bore 58 and has an elongated stem 77 axially slidably extended into the small diameter bore 59. An arm 78 is radially outwardly extended from the stem through the slot 65 and provides a lower arcuately depending safety stop portion 79 axially beneath the spindle 55.

The rear end portion 57 of the spindle 55 includes an inner screw threaded area 84 which is screw threadably received within the threaded portion 71 of the guide post 69. The rear end of the spindle includes an axially outwardly extended screw threaded periphery 85 which is extended through the aperture 34 in the rear plate 32 of the housing. The rear end of the spindle is axially constrained by a winged lock nut 86 screw threadably received thereon tightly against the rear plate 32. The rear end portion 57 of the spindle further includes an internal bore 87 and has an elongated longitudinally extended slot 88 extended inwardly from the periphery into the bore.

Figure 4:
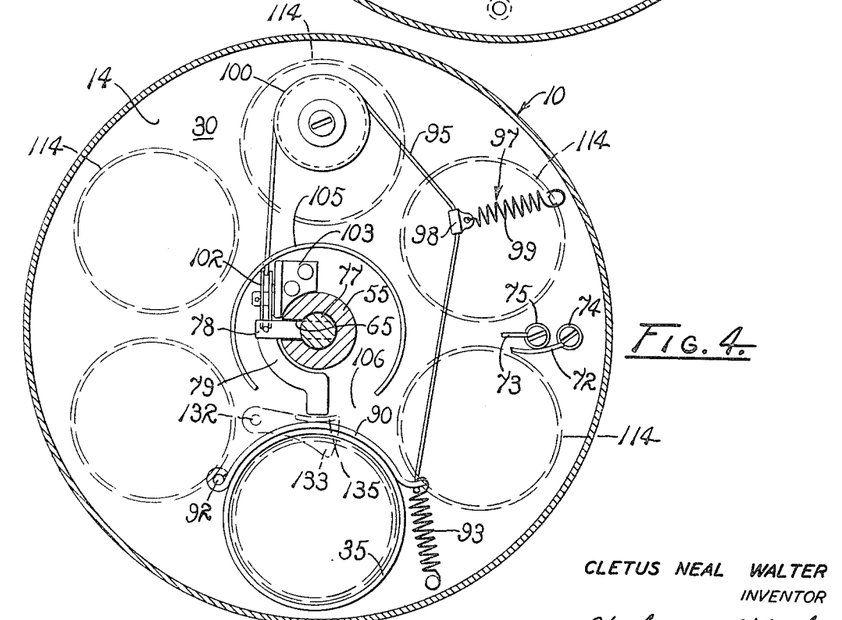
FIG. 4 is a somewhat enlarged transverse vertical section taken through the signaling device showing the trigger mechanism therefor.

As best shown in FIG. 4, an arcuate trigger 90 of substantially rigid sheet material is pivotally mounted on the front plate 30 by a substantially horizontal axially extended pivot pin 92. The opposite end of the trigger is connected to an elongated tension spring 93 mounted at its opposite end on the front plate normally to hold the trigger in intimate overlying contact with the inner end 36 of the barrel mounting sleeve 35. The opposite end of the trigger also provides a connection for an elongated flexible cable 95 which extends upwardly therefrom and slidably through a slack take-up or lost motion member 97. Such member includes a slide bracket 98 and a tension spring 99 connected at its opposite end to the front plate 30. The cable is further upwardly extended over a directional change pulley 100 rotatably mounted on the front plate on an axis parallel to the axis of the housing. The cable is then extended downwardly over a second pulley 102 mounted on a bracket 103 secured to the front plate for rotation on an axis normal to the axis of the housing. The end of the cable is connected to the arm 78 of the core stem 77. A circular safety shroud 105 is mounted on the inner face of the front plate 30 in substantially circumscribing relation to the forward end portion 56 of the spindle and provides a lower opening 106.

A signal storage magazine or cylinder 110 is mounted within the housing 10. The cylinder includes a centrally disposed hub or sleeve 111 which is journaled on the casing 66 of the solenoid winding coil 68. A plurality of elongated tubes 114 are mounted in circumscribing arrangement on the outer periphery of the sleeve and define elongated chambers 115 which are individually registrable with the inner end 36 of the barrel mounting sleeve 35. The tubes provide forwardly opening ends 116 adjacent to the front plate 30 and opposite rearwardly disposed partially closed ends 118 in closely spaced relation to the rear plate 32 of the housing. A plurality of signal constraining collars 125 are borne by the forwardly extended ends of the springs 120 for axial sliding movement within the chambers of the tubes. A plurality of spring biased latch members 130 are individually pivotally mounted on the forward end of the cylinder on circumferentially equally spaced pivot pins 132 disposed between the tubes 114. The flange members include inner portions 133 extended through the tubes into the chambers 115 and outer arcuate flange portions 135 which lie on a common circle in circumscribing relation about the shroud 105 and in successive overlying relation to the trigger.

Figure 5:
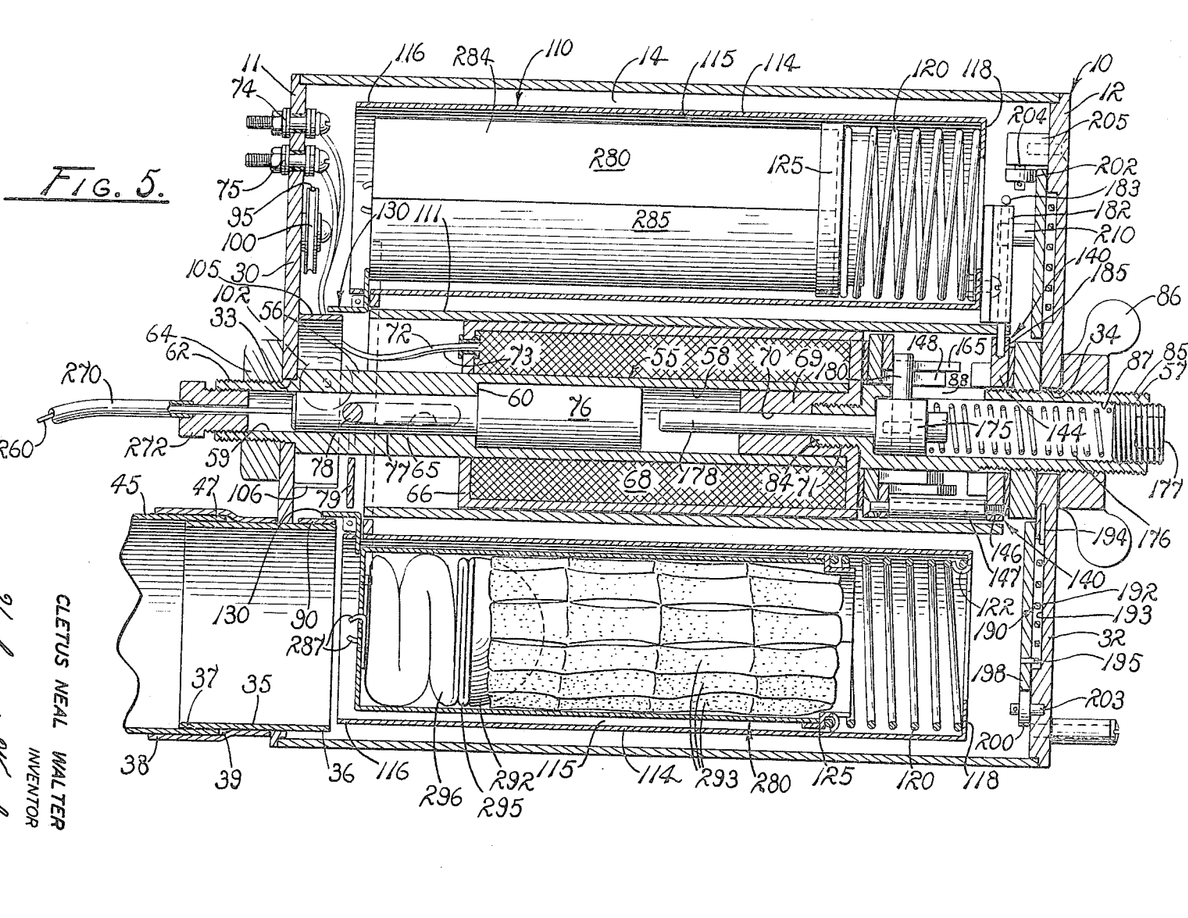
FIG. 5 is a further enlarged central longitudinal section of the main body portion of the signaling device.
Figures 9, 10, 11, 12, 13, 14, 15:
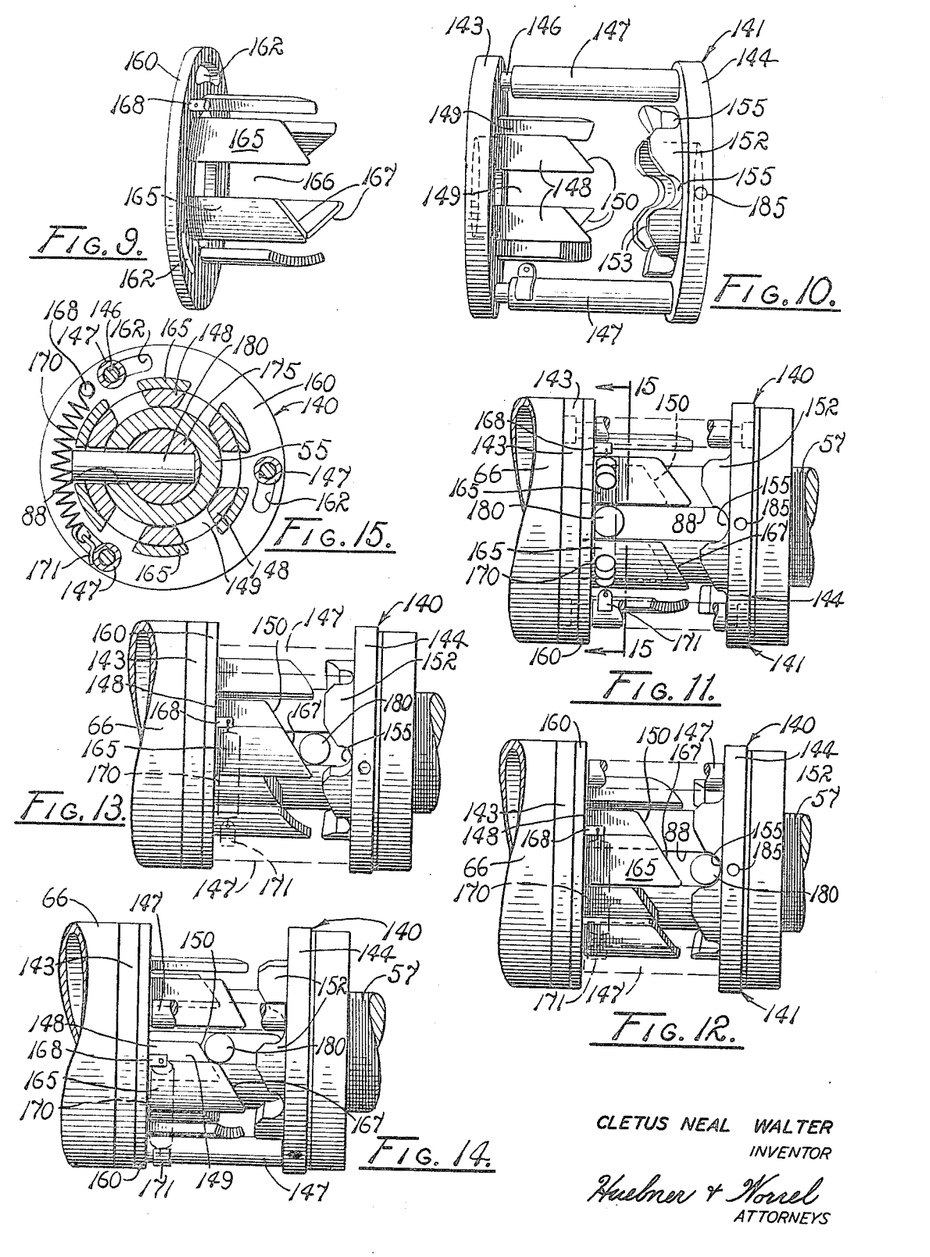
FIG. 9 is a perspective of a camming member shown removed from a cylinder indexing mechanism of the present invention.
FIG. 10 is a perspective of an indexing cage for the cylinder indexing mechanism with the camming member of FIG. 9 removed therefrom.
FIG. 11 is a side elevation of the cylinder indexing mechanism shown in a static condition.
FIG. 12 is a side elevation of the cylinder indexing mechanism with the camming members freed for rotation.
FIG. 13 is a similar view of the cylinder indexing mechanism with the camming members disposed in a position to initiate rotation of the cylinder.
FIG. 14 is a similar view of the cylinder indexing mechanism with the camming members disposed in a position nearing completion of cylinder rotation.
FIG. 15 is a transverse vertical section through the cylinder indexing mechanism taken on line 15—15 of FIG. 11.
Figure 16:
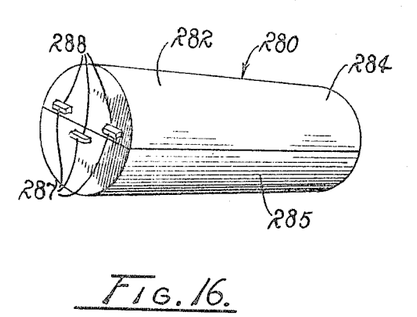
FIG. 16 is a perspective of a signal for the signaling device of the present invention shown in a closed position.

A cylinder indexing mechanism generally indicated by the reference numeral 140 is shown in FIG. 5 providing a cage 114 rotatably journaled on the rearward end portion 57 of the spindle 55 above the slot 88. As best shown in FIG. 10, the cage includes a pair of axially spaced forward and rearward end rings 143 and 144, respectively. The end rings are interconnected in spaced axial relation by a plurality of circumferentially spaced mounting screws 146 provided with spacer sleeves 147. The forward end ring 143 includes a plurality of axially extended circumferentially equally spaced camming lugs 148 rotatably mounted on the outer periphery of the rearward end portion 57 of the spindle. The camming lugs define a plurality of interstices 149 therebetween and angular end camming surfaces 150. The rearward end ring 144 has a plurality of stub camming lugs 152 providing angular camming surfaces 153 in spaced substantially parallel relation to the camming surfaces 150 of the camming lugs 148. The camming lugs 152 define therebetween a plurality of semi-circular notches 155 aligned with the interstices 149 between the camming lugs 148.

An inner camming ring 160 is mounted in facing sliding engagement with the upper surface of the forward end ring 143 and has a plurality of circumferentially extended elongated slots 162 to accommodate therethrough the mounting screws 146. The inner camming ring provides a plurality of axially extended circumferentially equally spaced camming fingers 165 disposed in circumscribing relation to the camming lugs 148 on the forward end ring. The camming fingers are somewhat longer than the camming lugs 148 and define interstices 166 therebetween which are precisely registerable with the interstices 149. The fingers also include outer camming surfaces 167 of the same angularity as the camming surfaces 150 and 153. A pin 168 is extended from the inner face of the inner camming ring which mounts one end of an elongated peripherally extended tension spring 170, the opposite end of which is connected to one of the spacer sleeves 147 by a connecting bracket 171. The peripheral spring 170, as best shown in FIG. 12, tends to index the camming fingers 165 and camming lugs 148 in staggered relation so as to align their camming surfaces 167 and 150.

An elongated piston 175 is slidably mounted in the bore 87 of the rear end portion 57 of the spindle 55. A return spring 176 is disposed within the bore normally to urge the piston inwardly thereof to the position shown in FIG. 5. The spring force is readily adjustable by a plug 177 screw threadably received within the outer screw portion 85 thereof. An elongated rod 178 is axially extended from the piston through the guide post 69 and into the large axial bore 58 in the forward end portion 56 of the spindle for engagement by the core member 76. A follower pin 180 is mounted on the piston 175 and is radially outwardly extended therefrom through the slot 88 and into the interstices 149 and 166. In such position, the fingers and lugs are constrained in substantially congruent relation with the tension spring 170 extended as in FIG. 11.

A block 182 is mounted on the cylinder adjacent to the closed ends of the tubes 114 for mounting an elongated locking rod 183 which is extendable through the sleeve 111 and into an aperture 185 in the periphery of the rearward end ring 144. In order to augment the force of the cylinder indexing mechanism, an energy storage device 190 is borne by the rear plate 32 for connection with the cylinder. The energy storage device includes a flat spiral spring 192 which is disposed in a circular groove 193 in the rear plate 32. The spring includes an inner end 194 which is connected to the end plate and an opposite outer end 195 which is connected to a rotary disc 198 disposed in sliding engagement against the inner face of the rear plate. The disc is held in such position by a plurality of peripheral rollers 200 and by a plurality of surface rollers 202 individually adjacent to the peripheral rollers. The peripheral rollers are mounted on axle pins 203 horizontally disposed in spaced parallel relation to the axis of the housing with the surface rollers 202 being constrained on axle pins 204 disposed normal to the axis of the housing on mounting blocks 205 secured to the rear plate 32. A drive pin 210 is axially extended from the disc 198 in abutting relation to the mounting block 182 after being pre-wound so as always to urge the cylinder for rotation in a clockwise direction, as viewed in FIG. 4.

A closure cap 215 is mounted in covering relation on the outer end 46 of the barrel 45 and provides an axially rearwardly extended annular flange 216. The flange has an upper circular aperture 217 and a pair of diametrically opposed side slots 218 opening rearwardly of the flange and extended inwardly thereof in oppositely equal angular relation to the longitudinal axis of the barrel. An anchor chain 219 is connected at one of its ends to the cap and at its opposite end to the bracket 48 supporting the outer end of the barrel. An outer sleeve 222 of a somewhat larger diameter than the barrel is rigidly mounted in circumscribing relation about the outer end thereof to form an annular slot 223 between the sleeve and the barrel. The sleeve also includes a rearwardly disposed closed end 224 against which is disposed a cap ejecting compression spring 226 in circumscribing relation to the barrel within the slot 223. A pair of diametrically opposed guide screws 227 are disposed on a common substantially horizontal axis between the sleeve and the barrel to limit outer movement of the spring and to be received within the side slots 218 of the flange to permit rotary inward movement of the flange into the annular slot.

The cap 215 is releasably constrained in covering relation to the outer end 46 of the barrel 45 by a cap ejecting mechanism generally indicated by the reference numeral 230. The ejecting mechanism is mounted on a substantially horizontal pedestal 232 secured to the upper periphery of the sleeve 222. A centrally disposed upwardly extended shaft 234 is rigidly secured to the pedestal and provides an upper screw threaded end 235. A wheel 237 is rotatably mounted on the lower end of the shaft in sliding relation to the pedestal and provides a grooved outer periphery 238 and an upper circular inclined ramp camming surface 240. A flat spiral spring 242 is connected at its inner end to the shaft and is connected at its outer end to the wheel normally to urge the wheel in a counterclockwise direction, as viewed in FIG. 6.

Figures 6, 7, 8:
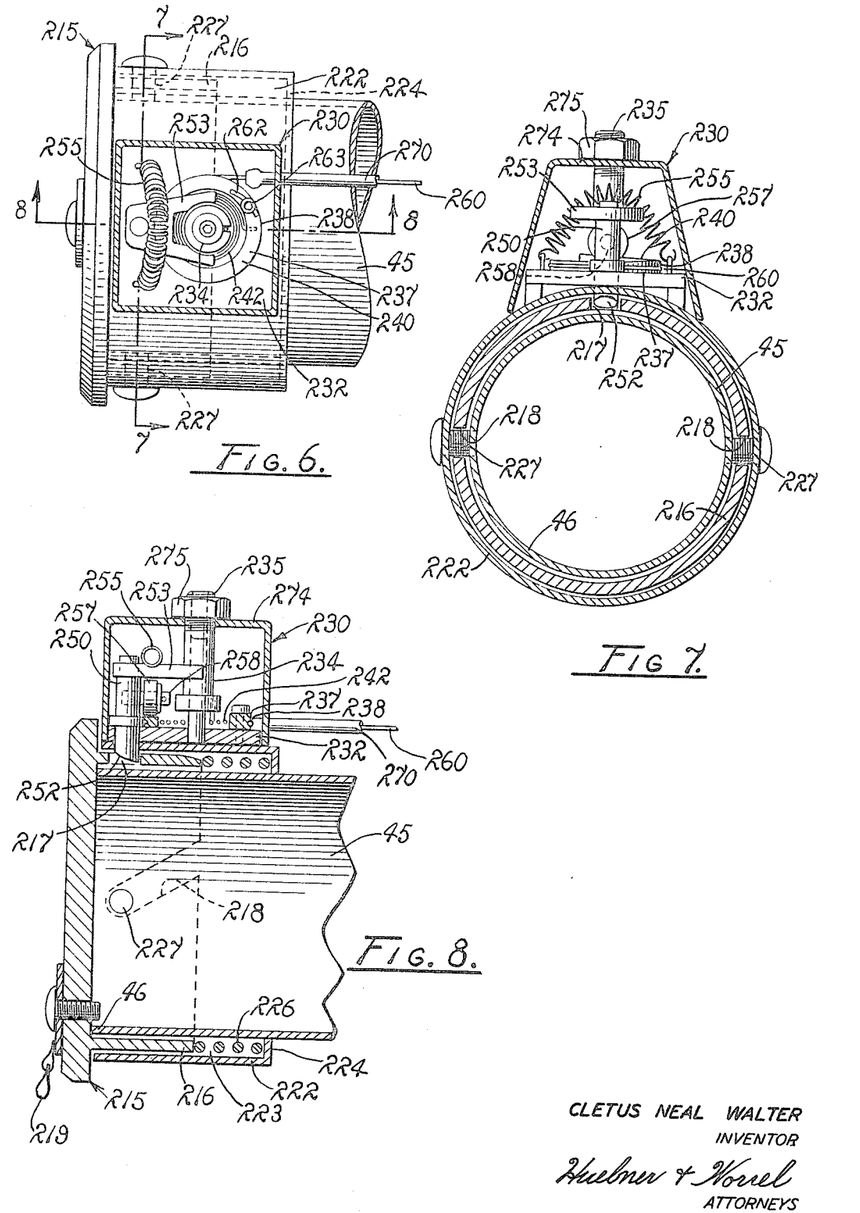
FIG. 6 is a fragmentary somewhat enlarged top plan view of a barrel cap ejecting mechanism of the present invention with the cover portion sectioned for illustrative convenience.
FIG. 7 is a transverse vertical section through the barrel cap ejecting mechanism taken on line 7—7 of FIG. 6.
FIG. 8 is a central longitudinal section taken through the barrel cap ejecting mechanism on line 8—8 of FIG. 6.

An elongated locking pin 250 is extended through the pedestal 232 and sleeve 222 and provides a lower forwardly upwardly inclined end portion 252 receivable within the aperture 217 in the flange 216 of the cap, as shown in FIG. 8. The upper end of the lock pin 250 carries a forked lever 253 which slidably embraces the shaft 234 so as to maintain the inclined lower end 252 of the locking pin in the desired camming relation with respect to the flange. An elongated tension spring 255 is disposed over the forked lever 253 with its opposite ends secured to the pedestal in U-shaped relation continually to urge the locking pin into the annular slot 223. A follower roller 257 is rotatably mounted on an axle pin 258 which is extended from the locking pin intermediate its ends on a substantially horizontal axis parallel to the axis of the housing. The roller is held against the lower portion of the upper camming surface 240 of the wheel by the U-shaped spring 255 when the wheel is disposed in the position shown in FIGS. 6, 7, and 8.

The locking pin 250 is raised by rotation of the wheel 257 in a clockwise direction, as viewed in FIG. 6 to permit ejection of the cap 215 by extension of the ejection spring 226. Such rotation of the wheel is effected by an elongated flexible cable 260 connected at its forward end 262 to the wheel at 263 which is wound about the grooved periphery 238 thereof and rearwardly extended for connection at its opposite end to the stem 77 on the core 76. The flexible cable is constrained and guided by an elongated conduit 270 mounted at its forward end on the pedestal and connected by way of a guide plug 272 screw threadably received within the forward end portion 56 of the spindle 55. A cover 274 is mounted over the cap ejecting mechanism and is constrained by a lock nut 275 tightened against the upper wall portion thereof on the upper end 235 of the shaft.

As best shown in FIGS. 16 through 20, a signal 280 is employed for discharging from the signal discharging device previously described. The signal provides a longitudinally split substantially cylindrical housing or shell 282 having separable semi-cylindrical portions 284 and 285. The housing is preferably fabricated of a light-weight substantially rigid material such as a suitable thermoplastic material or metal. Each of the semi-cylindrical portions of the housing is provided with hook members 287 which are receivable within complementarily formed openings 288 provided in their opposite or companion semi-cylindrical portions. The hooks and openings cooperate to provide a detachable pivotal connection between the semi-cylindrical portions of the housing. When pivotally interconnected and moved to the closed position of FIG. 16, the portions form a substantially cylindrical compartment 289 within the housing.

Figure 17:
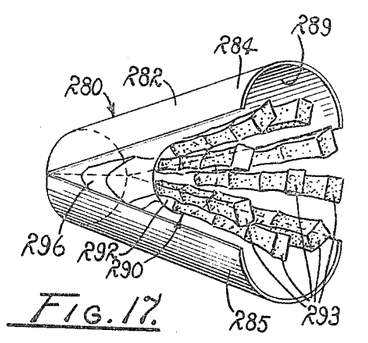
FIG. 17 is a perspective showing the signal disposed in a partially open position with a signal element visible therein.
Figure 18:
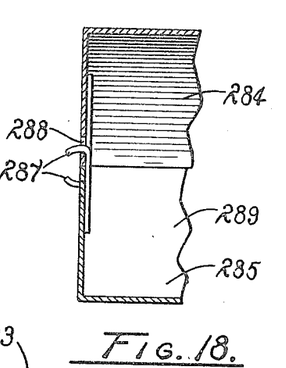
FIG. 18 is a fragmentary central section through connecting ends of the housing of the signal shown in a closed position.
Figure 19:
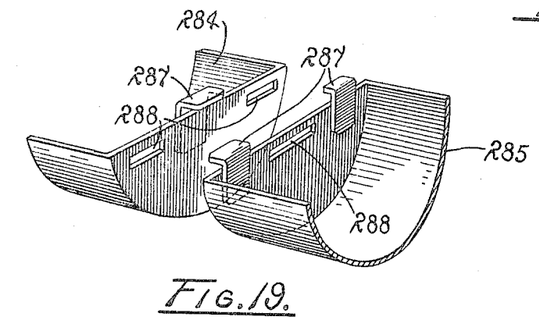
FIG. 19 is a perspective of the connecting ends of the housing shown in a separated condition.
Figure 20:
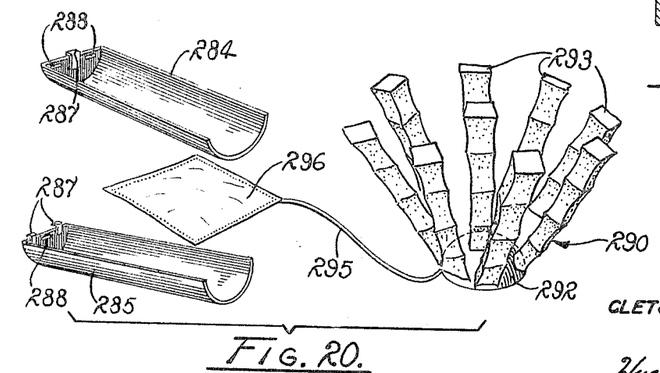
FIG. 20 is an exploded perspective view of the signal and its element.

As best shown in FIG. 5, the housing 282 is of a diameter slidably to be received within the chambers 115 of the cylinder 110 with the housing constrained in its closed position by the constraining collars 125 within the compartments. As shown in FIGS. 17 and 20, a signal element 290 is adapted to be stored within the compartment 289 of the housing. The signal element includes a base portion 292 from which a plurality of elongated fingers 293 are divergently extended. The fingers are preferably formed of a resilient elastomeric material such as sponge rubber or the like which is preferably provided with a luminescent coating of either phosphorescent, fluorescent, or merely reflective material to attract attention of observers. The base is connected by a flexible chord 295 to an anchor 296 formed by a flexible container filled with a weighting material such as leadshot or the like. When the signal element is disposed in the compartment 289 of the housing 282, the fingers are tightly wedged together which provides a reaction force tending to separate the semi-cylindrical portions of the housing. Such force is resisted, however, by the constraining collars 125 when the signal member is loaded into the chambers 115 in the cylinder 110.

Figure 1:
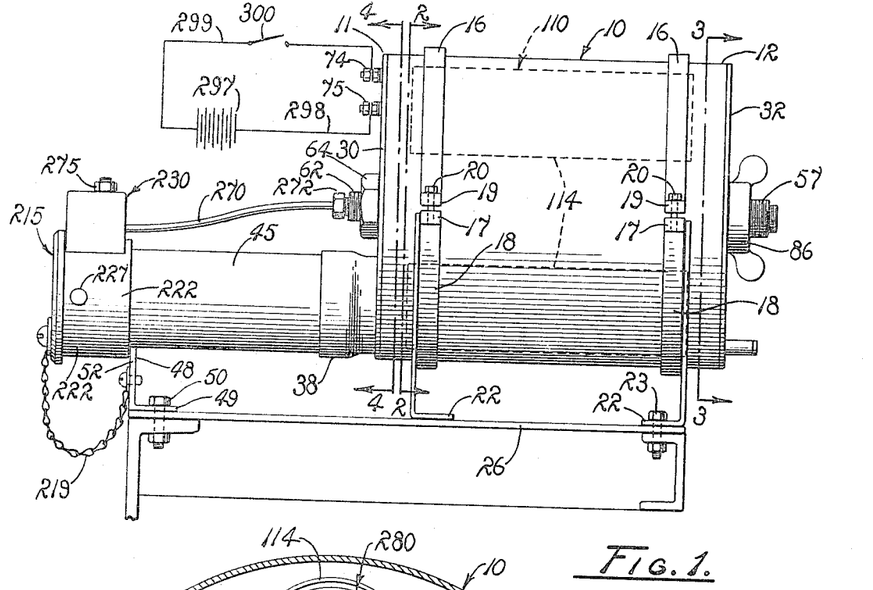
FIG. 1 is a side elevation of a signaling device embodying the principles of the present invention including a schematic diagram of an electrical control circuit therefor.
Figure 2:
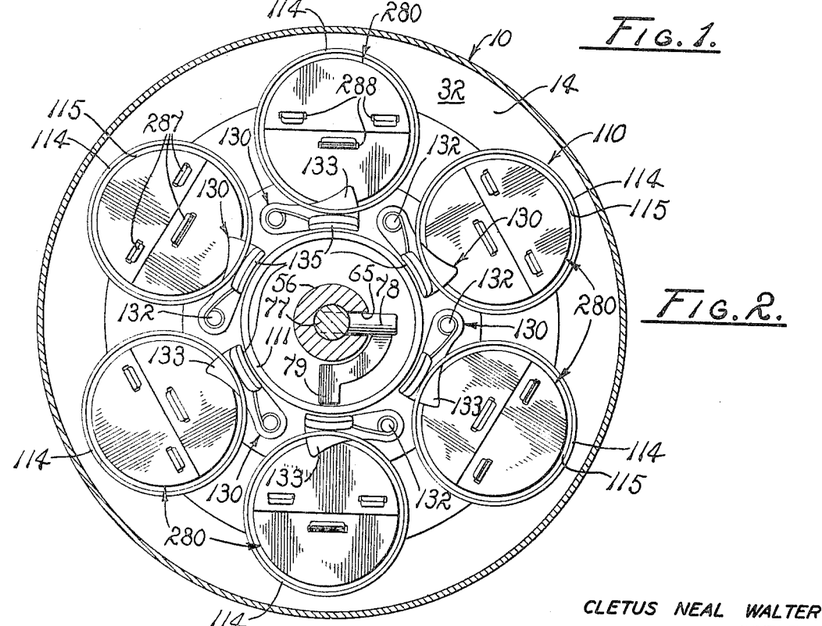
FIG. 2 is a somewhat enlarged transverse vertical section through the signaling device taken on line 2—2 of FIG. 1.
Figure 3:
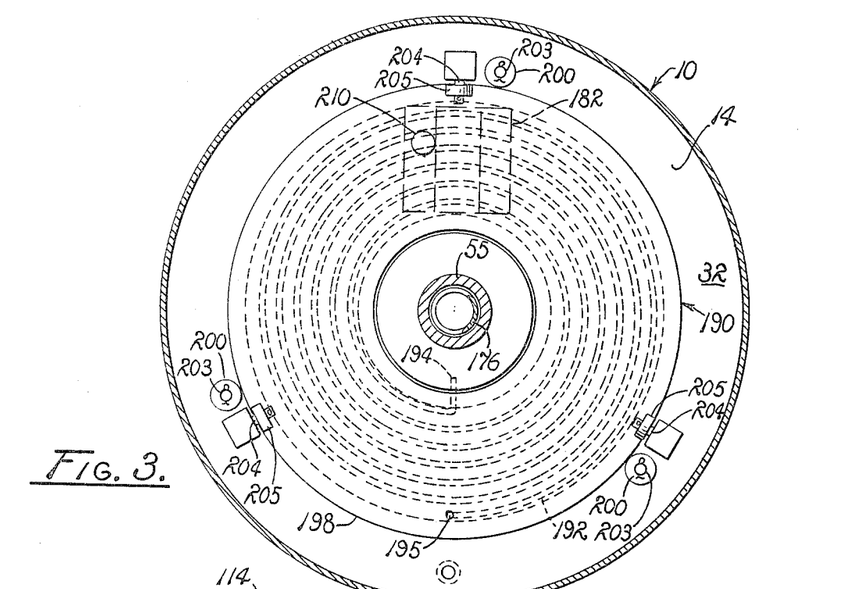
FIG. 3 is a somewhat enlarged transverse vertical section taken on line 3—3 of FIG. 1.

An electrical control circuit is schematically shown in FIG. 1 for energizing the solenoid coil 68 within the casing 66. The circuit includes a power source 297, such as the conventional battery employed in the vehicles which has an electrically conductive line 298 connected to one side thereof. The line 298 is connected at its opposite end to the mounting post 75 on the front plate 30 of the housing. An electrically conductive line 299 is connected to the other side of the battery and to the mounting post 74 on the front plate. A manually operable switch 300 is disposed within the leadline 299 for selectively energizing the solenoid and may be disposed in any convenient location on the vehicle, preferably in the driving compartment thereof.

*Operation*

The operation of the described embodiment of the subject invention is believed to be clearly apparent and is briefly summarized at this point. With the signaling device of the present invention mounted on a vehicle, not shown, the cylinder 110 is easily removable from the housing 10 for loading the signal 280 into the chambers 115. In order to load the cylinder, the winged lock nut 86 is removed from the threaded portion 82 of the rearward end portion 57 of the spindle 55 to permit removal of the rear plate 32. The cylinder is then easily slidably removed from the housing through the open rearward end thereof.

Before loading, each signal is prepared by extending the hook members 287 through their corresponding openings 288, and depositing the anchor 296, the chord 295 and the base portion 292 into the compartment 289. The fingers 293 are then compressed and folded into the remaining portion of the compartment and the semi-cylindrical portions 284 and 285 of the housing closed thereabout. The housing is manually held in such position until inserted into the chambers 115 of the cylinder 110. After insertion, the housing is constrained in its closed position by the constraining collar 125 during which insertion procedure the spring 120 is compressed to a predetermined preload for providing the force necessary subsequently to eject the signal member from the discharging device. Such insertion is accomplished by manually pivoting the latch member 130 to swing the inner portion 133 thereof outwardly of the chamber 115. After complete insertion of the signal member, the latch member is spring returned so that the inner end portion 133 engages the end of the signal member to hold the same within the chamber of the cylinder.

After loading all the chambers 115, the cylinder is reinserted into the housing with the sleeve 111 rotatably circumscribing the casing 66. The flat spiral spring 192 in the rear plate 32 is then wuond by manual roation of the disc 198 by the drive pin 210 and the rear plate 32 installed on the rearward end of the housing with the drive pin frictionally engaging the mounting block 182 on the cylinder. With such arrangement, the energy storage mechanism 190 in the rear plate 32 provides a continuous force tending to rotate the cylinder in a clockwise direction as viewed in FIG. 4. In its installed position as shown in FIG. 5, the cylinder is constrained against rotation by its connection with the cylinder indexing mechanism 140. Furthermore, the safety shroud 105 prevents inadvertent tripping of the arcuate flange portions 135 of the latch members 130 except with respect to the latch member disposed within the lower opening 106 of the shroud. Such latch member is associated with the chamber 115 of the cylinder aligned in precise registry with the inner end 36 of the barrel mounting sleeve 35.

During movement of the vehicle toward the scene of an accident, the operator actuates the switch 300 to complete the electrical circuit to the coil 68 which draws the core 76 inwardly thereof to the right, as viewed in FIG. 5. During initial movement of the core and the stem 77, the cable 260 is pulled rearwardly and rotates the wheel 237 in a clockwise direction as viewed in FIG. 6 so that the follower roller 257 rides up the camming surface 240. Such movement lifts the lock pin 250 from engagement with the aperture 217 in the flange 216 to permit the spring 242 to eject the cap 215 from the outer end 26 of the barrel 45. The cap is retained for replacement by the anchor chain 219. With continued movement of the core and stem, the safety stop portion 79 of the arm 78 is moved inwardly of the sleeve 111 of the cylinder 110 so as to free the arcuate flange portion 135 of the latch member 130 which is disposed within the lower opening 106 of the shroud 105. The safety shroud and safety stop portion of the arm thereby provide dual safety features to prevent inadvertent tripping of the latch members encircling the shroud and the latch member associated with the chamber aligned with the barrel.

During movement of the core and stem as just described, the cable 95 is concurrently tensioned. As best shown in FIG. 4, during each initial tensioning of the cable, no movement is transmitted to the trigger 90 by virtue of the lost motion permitted in the take-up member 97. However, as soon as the tension spring 93 is stretched sufficiently that the cable 95 straightens between the trigger and the upper pulley 100, further movement of the core and stem is transmitted directly to the trigger. Upon raising, the trigger engages the arcuate portion 35 of the latch member 130 to pivot the same upwardly and remove the inner end portion 133 from its position blocking the signal member 280. Upon complete removal of the latch, the signal member is liberated and propelled through the barrel 45 by extension of its compression spring 120.

Further movement of the core 76 causes it to engage the elongated rod 178 which forces the piston 175 to the right, as viewed in FIG. 5, against the return spring 176. Such movement also carries the follower pin 180 rearwardly from its forwardmost position of FIG. 11 to its rearwardmost position of FIG. 12 nested in a notch 155 between the camming lugs 152 of the rearward end ring 144. With the follower in such position, the camming fingers 165 are permitted to rotate past the follower and relative to the camming lugs 148 on the forward end ring 142 under the urging of the retracting peripheral spring 170. Such relative travel is permitted by movement of the mounting screws 146 through the elongated slots 162. All of the above described movement of the core, rod and piston to the maximum extended position with the follower disposed within the notch 155 occurs instantaneously with a single pressing and releasing of the switch 300. After such release of the switch, the return spring 176 returns the piston, follower member and core member to the left, as viewed in FIG. 5. The elongated rod, however, being originally spaced a short distance from the core, is not able fully to return the core against the shoulder 60 within the spindle. However, such full return of the core is provided by the spring 242 on the wheel 237 which, through the cable 260, motivates the core to its fully returned position.

During return movement of the piston 175, the follower 180 engages the camming surface 167 of the adjacent finger 165 which causes the entire cage 141 to be indexed in a counterclockwise direction, as viewed in FIG. 15. Such simultaneous movement of the inner camming ring 160 and the forward and rearward end rings 143 and 144, respectively, occurs as the peripheral spring 170 is collapsed and the mounting screws 146 are engaging the rearward ends of the slots 162 in the inner camming ring 160. During such rotation, the follower slides along the camming surface 167 and onto the camming surface 150 of the camming lugs 148. Such engagement causes further rotation of the forward end ring 143 until the interstices 149 and 166 are again aligned to permit full return of the follower against the inner camming ring 160 as shown in FIG. 11.

During the above described rotation of the cage 141 of the cylinder indexing mechanism 140, the cylinder 110 is permitted to be rotated a corresponding amount by its connection with the rearward end ring 144 through the locking rod 183. The pilot rotation provided by the cylinder indexing mechanism is augmented by the energy storage mechanism 190 in the rearward end plate 32 which, as described, continually provides a force against the cylinder in the direction of rotation of the cage 141. The spacing between the interstices 149 and 166 corresponds to the circumferential distance between the axial centers of the chambers 115 of the cylinder 110 so that upon every cycle of operation the next succeeding chamber is aligned in precise registry with the barrel 45. Such operation is duplicated upon each actuation of the manual switch 300 until all of the signal members have been ejected from the device.

During each discharge of a signal 280 and immediately after the signal housing 282 clears the outer end 46 of the barrel 45, the semi-cylindrical portions 284 and 285 thereof immediately open. Such opening of the housing is caused by the resilient fingers 293 which are permitted to expand and separate the semi-cylindrical portions of the housing upon release of the signal from the barrel.

Upon contact with the highway or other surface upon which the signal is deposited, the semi-cylindrical portions are completely separated as a result of the shock force encountered which completely releases the signal element 290. Since the base 292 of the signal element provides a low center of gravity, the fingers are automatically disposed in upwardly diverging relation in a desired signaling attitude with the chord and anchor 296 constraining the signal element in the desired deposited position.

With an automobile equipped with the signal device of the present invention, it is apparent that the signals 280 may be released only seconds apart or discharged at longer intervals at the discretion of the driver. As a result, the driver of such an automobile, upon approaching the scene of an accident, can lay down a string of signals at any desired spacing along the highway so as to warn following traffic of the hazard ahead. Also, it is apparent that the structure of the present invention has provided a signal device which is effective to deposit a signal in predetermined areas to warn of hazardous conditions without subjecting the depositor of such signal member to the dangers usually associated with such operation. The device is easily carried by a vehicle either exteriorly or interiorly thereof such as on the roof or in the trunk and effectively accurately deposits the signals on the highway while the vehicle is moving. This enables law enforcement officers, as well as drivers, generally to proceed to the scene of an accident without stopping manually to deposit a warning device in the most effective position ahead of the accident. The device is completely weather proof by its provision of a barrel closure cap which is automatically ejected prior to the discharge of the first signal. Furthermore, the signals provided a readily discernible warning is not easily damaged by vehicle wheels running over it and may be salvaged for reuse. Further, they do not damage tires of automobiles driven thereover.

Although the invention has been herein shown and described in what is conceived to be the most practical and preferred embodiment, it is recognized that departures may be made therefrom within the scope of the invention, which is not to be limited to the details disclosed herein but is to be accorded the full scope of the claims so as to embrace any and all equivalent devices and apparatus.

Having described my invention, what I claim as new and desire to secure by Letters Patent is:

1. A signaling device comprising a rotatable magazine having a plurality of chambers; a barrel; means for indexing the magazine in units of stepped progression successively to align the chambers with the barrel; resiliently collapsible signals; substantially cylindrical housing individual to the signals containing their respective collapsed signals under compression and individually slidably received in the chambers of the magazine, the housings being longitudinally divided into separable segments; and trigger operated means for discharging the signals and their respective housings through the barrel when their respective chambers are aligned therewith, the segments of each housing being separable upon impact under the expansion forces of the signal compressed therein to release the signal.

2. A signaling device comprising a cylindrical body having a barrel extended therefrom, signal storage means mounted for rotation in predetermined increments of stepped progression within the body, a plurality of signals disposed within said storage means for individual registry with said barrel between said increments of progression, force means mounted in said storage means individually engageable with said signals, an actuating mechanism mounted within the body for successively liberating the signals as they are registered with the barrel permitting their successive discharge from the storage means through the barrel by said force means, and indexing means mounted within the body for engagement by said actuating mechanism and having driving connection to said storage means to rotate the same through said increments of progression automatically upon discharge of said signals from the barrel.

3. A signaling device comprising a cylindrical body having a barrel extended therefrom, signal storage means, means mounting said storage means for rotation in predetermined increments of stepped progression within the body, a plurality of signals disposed within said storage means for succesive individual registry with said barrel between said increments of progression, force means mounted in said storage means individually engageable with said signals therein, latch means borne by said storage means individually disposed in releasable constraining engagement with said signals, actuating means mounted within the body individually engageable with said latch means for successively liberating the signals registered with the barrel permitting their discharge from the storage means through the barrel by said force means, and indexing means mounted within the body for engagement by said actuating means and having driving connection to said storage means to rotate the same through said increments of progression automatically upon the discharge of said signals from the barrel.

4. A signaling device comprising a cylindrical body having a barrel extended therefrom, a signal magazine having opposite open and closed ends, means mounting said magazine for rotation in predetermined increments of stepped progression within the body, a plurality of signays disposed within said magazine for successive individual registry with said barrel between said increments of progression, force means mounted in said magazine adjacent to said closed end thereof individually engageable with said signals, latch means mounted on said magazine adjacent to said open end thereof in releasable constraining engagement with the signals, actuating means mounted within the body individually engageable with said latch means for liberating the signals registered with the barrel permitting their successive discharge from the magazine through the barrel by said force means, and indexing means mounted within the body for engagement by said actuating means and having driving connection to said storage means to rotate the same through said increments of progression.

5. A signaling device comprising a cylindrical body having a longitudinal axis and a tubular spindle disposed on the axis, said body including a barrel extended therefrom in eccentric substantially parallel relation to said axis; a cylinder having a plurality of elongated tubular chambers providing opposite open and closed ends rotatably journaled on said spindle within the body for rotation of the cylinder in predetermined increments of stepped progression; a plurality of resiliently compressible members individually mounted in said chambers of the cylinder adjacent to said closed end thereof; a plurality of signals disposed within said chambers in compressing relation to said resilient members and being individually registrable with said barrel between said increments of progression; a plurality of latch members pivotally mounted on said cylinder adjacent to said open ends of the chambers releasably to constrain said signals therein in compressing relation to said resilient members; an actuating member mounted within the body adjacent to said barrel individually to engage said latch members; powered means axially slidably disposed within said tubular spindle having connection to said actuating member for individually motivating said latch members to a position successively liberating the signals as they are registered with the barrel to permit their successive discharge from their respective chambers through the barrel by said resilient members; and a cylinder indexing mechanism mounted on said spindle having a finger portion disposed within the spindle in coaxial abutting relation to said powered means to permit rotation of the cylinder through said increments of progression subsequent to the discharge of each of the signals.

6. A signaling device comprising a cylindrical body having a longitudinal axis and opposite predetermined front and rear plates supporting a tubular spindle on the longitudinal axis of the body; an elongated barrel mounted on said front plate eccentrically of said axis and extended from the body in spaced substantially parallel relation to the axis; a cylinder having a hub and a plurality of elongated tubular chambers providing opposite open and closed ends mounted in circumscribing arrangement on the hub, said hub being journaled on said spindle within the body for rotation of the cylinder in predetermined increments of stepped progression; a plurality of resiliently compressible members individually mounted in said chambers of the cylinder adjacent to said closed end thereof; a plurality of signals disposed within said chambers in compressing relation to said resilient members and being individually successively registrable with said barrel between said increments of progression; a plurality of latch members pivotally mounted on said cylinder individually adjacent to said open ends of the chambers releasably to constrain said signals therein in compressing relation to said resilient members; a trigger pivotally mounted within the body adjacent to said barrel individually successively to engage said latch members; powered means axially slidably disposed within said tubular spindle having connection to said trigger for motivating the latch members to a position successively liberating the signals as they are registered with the barrel to permit their successive discharge from their respective chambers through the barrel by said resilient members, and a cylinder indexing mechanism mounted on the spindle having a finger portion disposed within the spindle in closely spaced coaxial relation to said powered means so that during said axial movement of the powered means the cylinder indexing mechanism is actuated to permit rotation of the cylinder through said increments of progression subsequent to the discharge of each of the signals.

7. A signaling device comprising a cylindrical body having a longitudinal axis and opposite predetermined front and rear plates supporting a tubular spindle on the longitudinal axis of the body; an elongated barrel having an inner end mounted on said front plate in eccentric relation to said axis and outwardly extended therefrom in substantially parallel relation to the axis; a cylinder having a hub and a plurality of elongated tubular chambers providing opposite open and closed ends mounted in circumscribing arrangement on the hub, said hub being journaled on said spindle within the body for rotation of the cylinder in predetermined increments of stepped progression; a plurality of resiliently compressible members individually mounted in said chambers of the cylinder adjacent to said closed end thereof; a plurality of signals disposed within said chambers in compressing relation to said resilient members and being individually successively registrable with said barrel between said increments of progression; a trigger pivotally mounted on the inner end of the barrel within the body; a plurality of latch members pivotally mounted on said cylinder adjacent to said open ends of the chambers having inner portions extended into said chambers releasably to constrain said signals therein in compressing relation to said resilient members and arcuate flange portions disposed on a common circle successively disposed in overlying relation to the trigger as they are registered with the barrel; powered means axially slidably disposed within said tubular spindle having connection to said trigger for pivoting the same successively to liberate the signals; and a cylinder indexing mechanism mounted on the spindle having an elongated rod disposed within the spindle in closely spaced coaxial relation to said powered means so as to be driven thereby during said axial movement of the powered means to actuate the cylinder indexing mechanism to permit rotation of the cylinder through said increments of progression subsequent to said discharge of each of the signals.

8. A signal discharging device comprising a cylindrical body having a longitudinal axis and opposite predetermined front and rear plates supporting a tubular spindle on the longitudinal axis of the body; an elongated barrel having an inner end mounted on said front plate in eccentric relation to said axis and outwardly extended therefrom in substantially parallel relation to the axis and providing an outer end; a cap releasably disposed on said outer end of the barrel in covering relation thereto; lock means mounted adjacent to said outer end of the barrel constraining the cap in said covering relation thereon and including force means to eject the cap therefrom; a cylinder having a hub and a plurality of elongated tubular chambers providing opposite open and closed ends mounted in circumscribing arrangement on the hub, said hub being journaled on said spindle within the body for rotation of the cylinder in predetermined increments of stepped progression; a plurality of resiliently compressible members individually mounted in said chambers of the cylinder adjacent to said closed end thereof; a plurality of signals disposed within said chambers in compressing relation to said resilient members and being individually successively registrable with said barrel between said increments of progression of the cylinder; a trigger pivotally mounted on the inner end of the barrel within the body; a plurality of latch members pivotally mounted on said cylinder adjacent said open ends of the chambers having inner portions extended into said chambers releasably to constrain said signals therein in compressing relation to said resilient members and arcuate flange portions disposed on a common circle successively disposed in overlying relation to the trigger as they are registered with the barrel; powered means axially slidably disposed within said tubular spindle providing a first tension member secured to said lock means on the barrel to release the same and permit ejection of the cap upon initial movement of said powered means and providing a second tension member fastened to said trigger for lifting the overlying flange portions of the latch members to move the inner portions thereof outwardly of the chamber to liberate the signals as they are registered with the barrel and including lost motion means to insure discharge of the signals subsequent to said ejection of the cap to permit unrestricted discharge of the signals through the barrel by expansion of their respective resilient members; and a cylinder indexing mechanism mounted on the spindle having an elongated rod disposed within the spindle in closely spaced coaxial relation to said powered means so as to be driven thereby during said axial movement of the powered means to actuate the cylinder indexing mechanism to permit rotation of the cylinder through said increments of progression subsquent to the discharge of the signals.

9. A signaling device comprising a cylnidrical body having a barrel extended therefrom, a signal storage cylinder mounted for rotation in predetermined increments of stepped progression within the body and having a plurality of chambers therein providing opposite open and closed ends, a plurality of signal elements individually disposable within said chambers, means for indexing the cylinder for individual registry of the chambers with said barrel between said increments of progression, force means mounted in said closed ends of the chambers and being engageable with said signal elements of their respective chambers, latch means mounted on the cylinder adjacent to said open ends of the chambers in releasable constraining engagement with said signal elements, actuating means mounted on the body adjacent to said barrel and being successively engageable with said latch means to liberate said signal elements from their respective chambers as they are aligned with the barrel, closure means releasably secured in covering relation to said barrel, and an ejecting mechanism controllably connected between said closure means and said actuating means and including lost motion means to effect removal of said closure means from the barrel prior to the actuation of said latch means to liberate said signal elements.

10. The signaling device of claim 9 in which the closure means comprises a cap releasably secured in covering relation to the barrel; and said ejecting mechanism includes a lock member mounted on the barrel constraining the cap on the barrel and including force means to eject the cap therefrom, powered means mounted in the body providing a first tension member secured to said lock member on the barrel to release the same and to permit ejection of the cap upon initial movement of said powered means and providing a second tension member fastened to said latch means for liberating the signals as they are registered with the barrel and including lost motion means to insure discharge of the signals subsequent to said ejection of the cap.

References Cited by the Examiner
UNITED STATES PATENTS

| 1,903,082 | 3/1933 | Adam. | |
| 2,682,770 | 7/1954 | Strickler et al. | 102—1 |
| 2,751,582 | 6/1956 | Kuykendall | 116—63 |
| 2,778,332 | 1/1957 | Talbot | 116—124 |
| 2,971,731 | 2/1961 | Graw | 124—48 X |
| 3,043,263 | 7/1962 | Klojj et al. | 116—124 |
| 3,049,091 | 8/1962 | Carroll et al. | 116—124 |

LOUIS J. CAPOZI, *Primary Examiner.*

I. J. LEVIN, *Examiner.*

N. C. READ, *Assistant Examiner.*